Sept. 9, 1969   R. HOHENBERG   3,465,581
MEANS FOR TEMPERATURE COMPENSATING THE RESPONSE
OF AN ELECTROMAGNETIC TORQUEMETER
Original Filed April 9, 1965   3 Sheets-Sheet 1
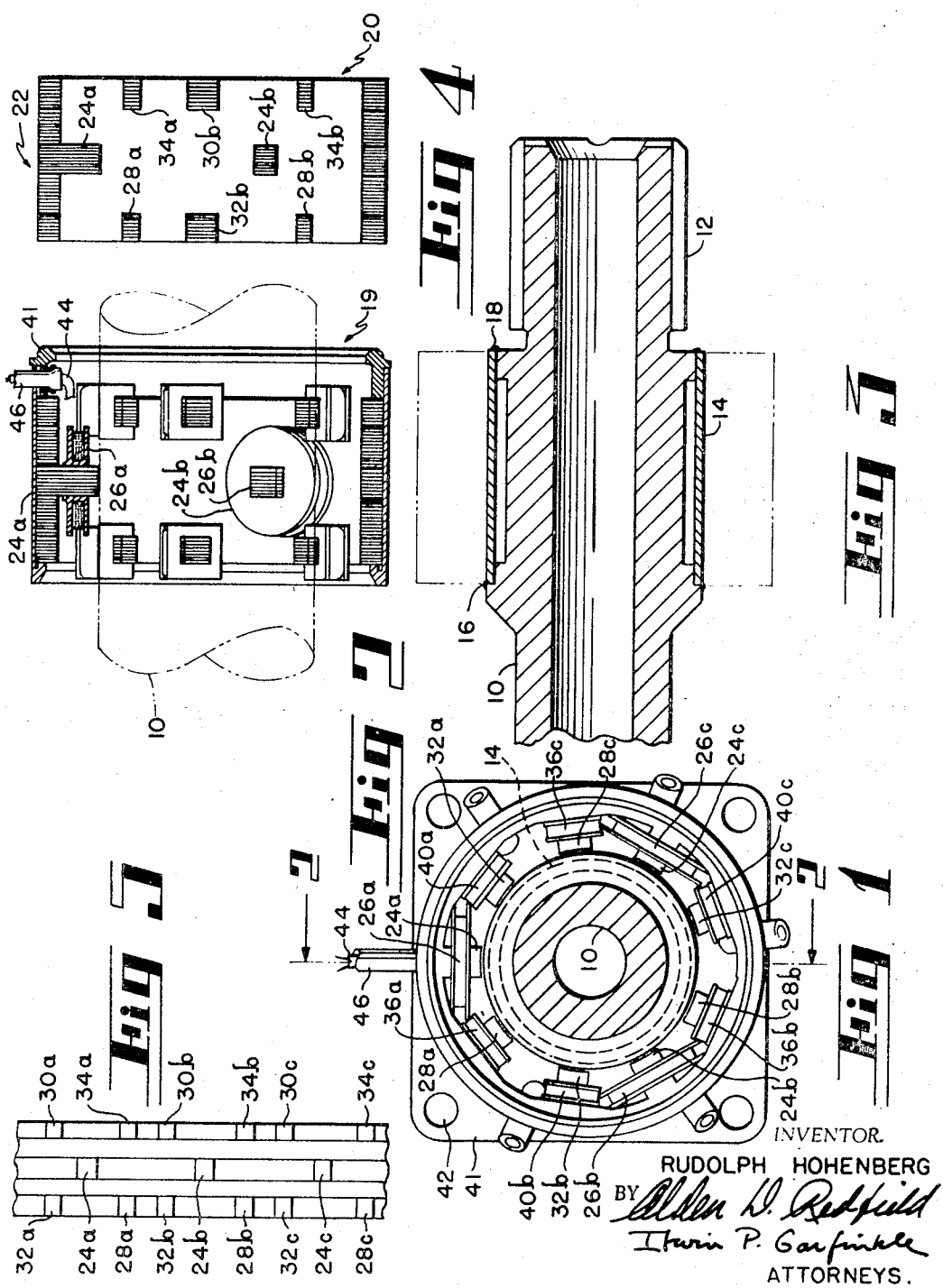
INVENTOR.
RUDOLPH HOHENBERG
BY
ATTORNEYS.

Sept. 9, 1969  R. HOHENBERG  3,465,581
MEANS FOR TEMPERATURE COMPENSATING THE RESPONSE
OF AN ELECTROMAGNETIC TORQUEMETER
Original Filed April 9, 1965  3 Sheets-Sheet 3

INVENTOR.
RUDOLPH · HOHENBERG
BY
ATTORNEYS.

United States Patent Office 3,465,581
Patented Sept. 9, 1969

3,465,581
MEANS FOR TEMPERATURE COMPENSATING THE RESPONSE OF AN ELECTROMAGNETIC TORQUEMETER
Rudolph Hohenberg, Trumbull, Conn., assignor to Avco Corporation, Stratford, Conn., a corporation of Delaware
Continuation of application Ser. No. 446,871, Apr. 9, 1965. This application Nov. 20, 1967, Ser. No. 697,252
Int. Cl. G01l 3/02
U.S. Cl. 73—136        6 Claims

ABSTRACT OF THE DISCLOSURE

The response of an electromagnetic torquemeter including a stationary core transformer surrounding a rotating shaft is affected by changes in temperature. This change is compensated by selecting materials of the shaft and the core so that the air gap between the core and the shaft decreases with increases in temperature.

---

This is a continuation of application Ser. No. 446,871 filed Apr. 9, 1965, now abandoned.

This invention relates to torquemeters in which torque is determined by measuring the magnetic reluctance of a magnetic shaft, and more particularly to a unique arrangement for assuring that torquemeter response is independent of temperature.

It is known that torsion can be measured in a magnetic shaft by encircling the shaft with two or more stationary magnetic cores having salient poles facing the shaft and being arranged side by side in the direction of the shaft, one of the cores being provided with an excitation or primary winding connected to an alternating current source and the other core or cores being provided with measuring or secondary windings connected to an electric measuring device. The secondary winding is physically positioned at an angle of 45° with respect to the primary winding, and thus if the magnetic shaft is not loaded, the magnetic fields between the different poles will be symmetrical so that equipotential lines are situated symmetrically under the secondary poles. However, when torque is applied to the shaft, the permeability of the shaft in the direction of tension is increased, while the permeability in the direction of compression is decreased, and the resulting fluxes cooperate in inducing an output voltage in the secondary windings. Such a prior art device is disclosed in a United States patent to Dahle No. 3,011,340, and in the copending application of Scoppe, Ser. No. 428,323 filed Jan. 27, 1965, now patent No. 3,340,729, and assigned to the same assignee as this invention.

The prior art, as demonstrated by the Dahle patent, determined torque by measuring the permeability of the rotating shaft. Scoppe's invention represented an improvement over the prior art in that he affixed a magnetic sleeve to the load-carrying shaft so that he then sensed changes in permeability due to torsional strains in the sleeve rather than in the shaft. Therefore, Scoppe can select a material for the shaft to optimize the properties required for the shaft, such as strength and hardness, while at the same time a material with the desired magnetic properties can be independently selected for the sleeve. This invention constitutes an improvement over Scoppe by assuring that there will be no variations in the torquemeter response due to changes in temperature.

Briefly described, this invention seeks to provide a temperature-compensated electromagnetic torquemeter. If a prior art uncompensated torquemeter is used to measure a constant torque applied to a shaft, it will be found that the torquemeter response will vary with temperature.

I have proposed schemes for temperature compensation involving the use of a variable excitation voltage for the torquemeter windings, the voltage being varied as a predetermined function of temperature to maintain a constant response with variations in temperature. This arrangement, while believed novel and precise, suffers from the fact that additional costs and complexity are added to the system. On the other hand, the present invention achieves a wide range of temperature compensation without added parts, by making a selection of materials having temperature coefficients of expansion which serve to vary the air gap between the shaft (or sleeve) and the magnetic cores of the torquemeter windings as an inverse function of temperature.

It is therefore an object of this invention to improve the operating characteristics of an induction-type torquemeter for determining torque applied to a shaft by measuring the torsional strain in a magnetic sleeve affixed to the shaft, and by providing means for compensating the variation in sensitivity of said torquemeter due to temperature variations in said shaft without the addition of parts or critical controls.

Still another object of this invention is to provide means for measuring torque applied to a rotating magnetostrictive shaft, said means comprising a coil mounted on a stationary core surrounding the sleeve, means for applying alternating current to the coil whereby a magnetic field is generated in the shaft, means for measuring the change in permeability in the shaft due to torque applied to the shaft, and means for varying the air gap between said core and said shaft with variations in temperature.

For other objects and for a clearer understanding, the invention will be described in connection with a torquemeter which has been actually reduced to practice and which was previously described in connection with said Scoppe invention. Reference should therefore be made to the following detailed specification and to the accompanying drawings in which:

FIGURE 1 is an end view of a preferred embodiment of this invention;

FIGURES 2, 3, and 4 are sections taken through the line 2—2 of FIGURE 1, FIGURE 2 showing the details of the cores and coils with the rotating shaft shown in outline, FIGURE 3 showing the details of the rotating shaft with the cores and coils shown in outline, and FIGURE 4 showing the details of the core;

FIGURE 5 is a plane projection of the poles of the core on the sleeve;

Referring to FIGURES 1–4, the invention seeks to measure the torque applied to a rotating shaft 10 which may be keyed at 12 to a prime mover, such as a gas turbine, not illustrated. For the purposes of this invention the shaft 10 may be constructed of magnetic material, the permeability of which can be measured to determine torque, or preferably it may be constructed of any material suitable for its particular application, and it may or may not have magnetostrictive properties. Instead, and as illustrated, a magnetic sleeve 14 is welded, or otherwise rigidly attached, to the shaft 10 around its periphery at 16 and 18. Said sleeve and shaft must be of materials with the same coefficient of thermal expansion. While the weldments have been illustrated as raised portions on the shaft and sleeve, it will be understood that there are in fact no projections in the finished assembly. After the sleeve has been affixed, the shaft 10 and the sleeve 14 are stress relieved by first heating and then slowly cooling. The particular temperatures for this purpose are determined by the particular materials used. Thereafter, a static predetermined torsional strain is applied to the shaft 10 and sleeve 14 so that the magnetostrictive strain versus permeability characteristics of the sleeve 14 are altered. The static strain applied to the shaft and sleeve is generally in excess of any strain resulting from the application of torque to the shaft during normal operation.

As a result of this static strain, it has been observed that the linearity of the torque versus reluctance curve is changed as a function of the degree of applied static torque.

The magnetic sleeve 14 is encircled by a transformer 19 including a laminated three-section magnetic core 20, each of the sections having a plurality of poles extending radially towards the sleeve 14 but spaced a short distance therefrom to provide a small air gap around the entire periphery of the sleeve 14. It is this air gap which is to be controlled in accordance with this invention.

The refrenced Dahle Patent 3,011,340 suggests a relationship between torsional stress and magnetic effects. This relationship holds true, however, only at constant temperatures. More correctly, a relationship exists between torsional strain and magnetic effects.

Figure 7:
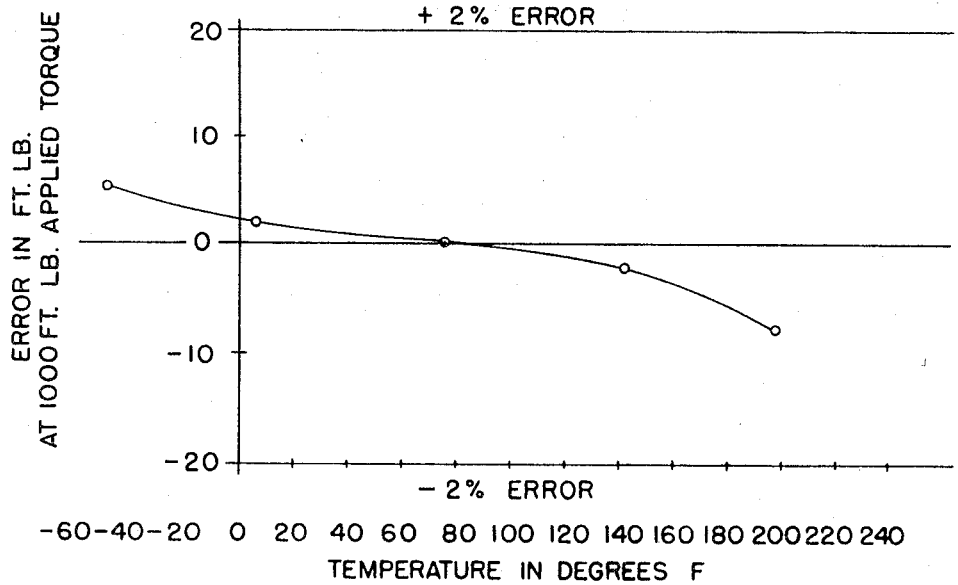
FIGURE 7 is a curve showing the performance results of this invention.

It is also known that the average air gap between the magnetic cores and the sleeve affects the sensitivity of the torque versus torquemeter indication calibration. That is, as the air gap decreases, there is an increase in sensitivity. To utilize this phenomenon I make the sleeve and shaft of materials whose coefficient of thermal expansion is larger than the coefficient of thermal expansion of the core laminations, and thus the average air gap decreases with increases in temperature. By proper selection of the outside diameter of the shaft or sleeve, the nominal air gap, and the difference in thermal expansion between the sleeve and shaft and that of the magnetic core laminations, compensation for the decrease of torquemeter sensitivity with temperature is achieved. Practical experience in the selection of materials has resulted in compensations resulting in deviations of less than 1% over a tempearture range of 250° F. These results were achieved in a torquemeter reduced to practice with laminations of 50% nickel, 50% iron (coefficient of thermal expansion $3.2 \times 10^{-6}$ per degree F.), a 2.5% silicon steel sleeve (coefficient of thermal expansion $6.4 \times 10^{-6}$ per degree F.), a shaft diameter of 1.8 inches, and a nominal air gap of .014 inch at 75° F. The results achieved with the particular materials used are shown in FIGURE 7.

The magnetic core 20 is shown in FIGURE 4 with the pole spacings for each of the sections shown in projection in FIGURE 5.

The core 20 includes a primary section 22 having three poles 24a–c, each spaced 120° around the inner periphery of the core 20 and provided with primary windings 26a, 26b, and 26c, respectively.

The secondary portion of the core is provided with six pairs of holes. The poles in each of three of the pairs of poles 28a and 30a, 28b and 30b, and 28c and 30c are physically aligned with the poles 26a, 26b, and 26c, respectively, along a line which is at 45° with respect to the axis of the shaft 10, this line corresponding to the direction of tension resulting from applied torque to the shaft. The other three pairs of secondary poles 32a and 34a, 32b and 34b, and 32c and 34c are similarly aligned with the primary poles, but in the direction of compression. Each of the poles 28a–c and 30a–c is provided with a winding 36a–c and 38a–c, respectively, arranged in corresponding pairs, while each of the poles 32a–c and 34a–c are similarly provided with windings 40a–c and 42a–c. Thus, pairs of the windings 36a–c and 38a–c are aligned with a respective primary winding 26a–c in the direction of tension while pairs of the windings 40a–c and 42a–c are similarly aligned in the direction of compression. As will be seen in FIGURE 6, the windings 40a, 42a, 40b, 42b, 40c, and 42c are connected in series while the windings 36a, 38a, 36b, 38b, 36c, and 38c are similarly connected in series. The physical arrangement of the pairs of windings means that each pair of windings will be influenced only by the compression strain or the tension strain and that any non-homogeneities in the sleeve 14 will be averaged out by the series connections of the pairs.

The entire core is potted with a suitable plastic, not shown, and is fixedly mounted in a support 41 provided with holes 42 for mounting the assembly in stationary relationship with respect to the rotating shaft. Electrical wires 44 from the coils extend through a sleeve 46 to control circuitry and an indicator diagrammatically illustrated in FIGURE 6.

Figure 6:
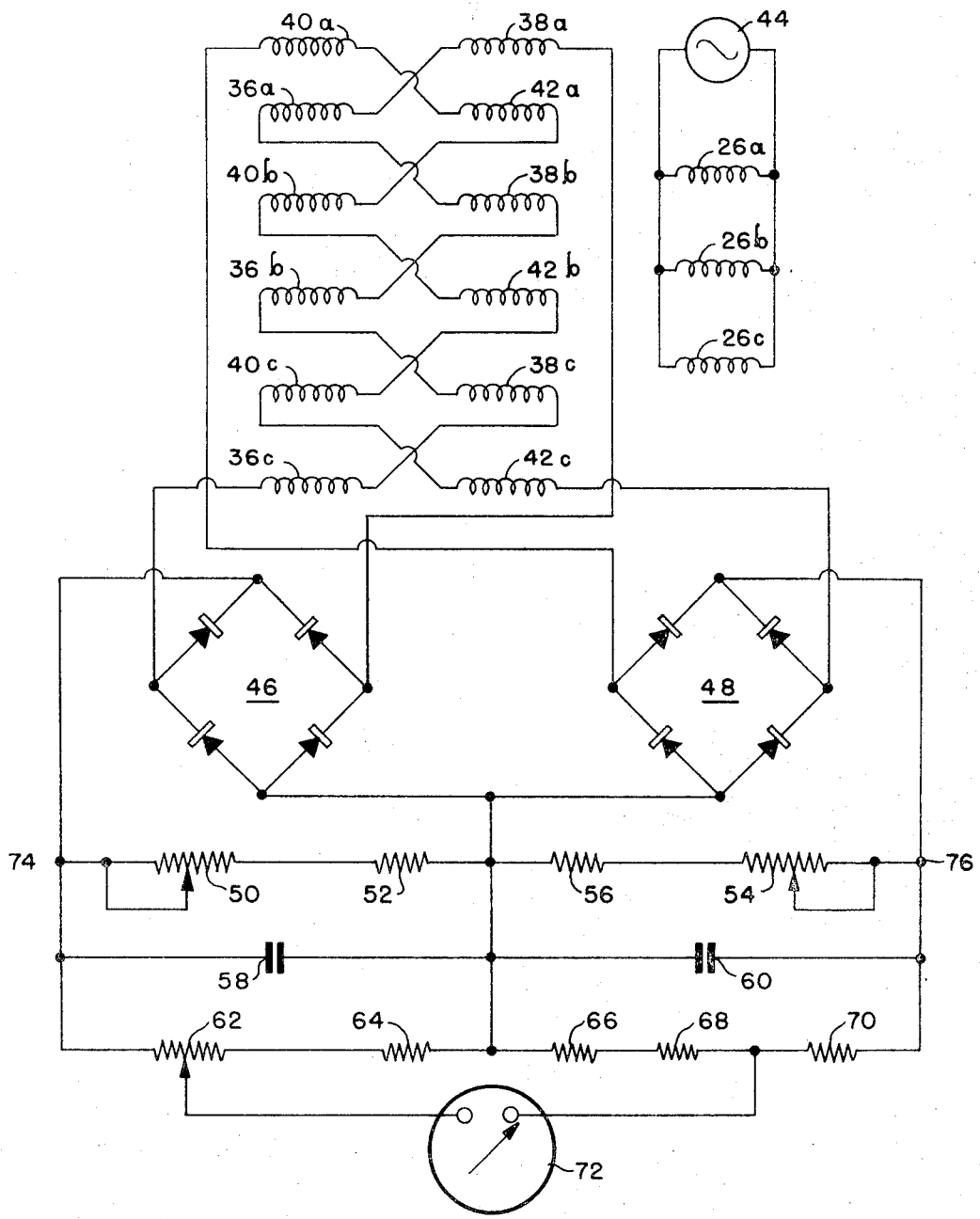
FIGURE 6 is an electrical schematic diagram showing the use of the invention.

Referring to FIGURE 6, the primary windings 26a–c are connected in parallel across an alternating current source 44, and the current flowing through these windings serves to generate a constant magnetic flux in the sleeve 14. The alternating currents generated in the series-connected secondary windings 36a–c and 38a–c are converted to a direct current by means of a full-wave rectifier 46 while the currents generated in the secondary windings 40a–c and 42a–c are converted to a direct current by full-wave rectifier 48. The resistors 50 and 52 are connected across the output of rectifier 46, while resistors 54 and 56 are connected across the output of rectifier 48, the resistors 50 and 54 being adjustable to provide zero output from the rectifiers in the absence of applied torque to the shaft and for adjusting the slope of the torque versus output current curve so as to correspond with indicator calibrations. Capacitors 58 and 60 in parallel with resistors 62, 64, 66, 68, and 70 provide the input to the indicator 72, the resistor 62 having an adjustable tap for making any necessary zero adjustment on the indicator 72.

Calibrating the system requires that the current developed through the indicator 72 conforms to a standardized relation between torque and current. This is necessary to provide free interchange without system recalibration of the indicator 72. The standardization of the torque versus current calibration is accomplished by adjusting for zero meter indication with no torque on the shaft by moving the tap on resistor 50 to provide more resistance between junction 74 and resistor 52, simultaneously changing resistor 54 an equal amount to provide less resistance between junction 76 and resistor 56, or vice versa. The slope of the torque versus current relationship is changed by simultaneously adjusting potentiometers 50 and 54 an equal amount to provide more or less resistance. The linearity of the torque-current relationship is altered by applying torque to the shaft 12 with the sleeve 14 attached. Application of torque in the direction to be measured but in excess of the highest torque to be measured will make the torque-current relationship more linear. Torque application in the opposite direction but also in excess of the highest torque to be measured will make the torque-current relationship more non-linear.

What is claimed is:

1. In a system for measuring the torque applied to a rotating cylindrical shaft, at least a portion of said shaft being provided with magnetostrictive properties, the combination comprising:

a stationary core mounted adjacent said portion with a predetermined air gap between said core and the surface of said shaft;

a primary winding supplied with alternating currents wound on said core;

a secondary winding wound on said core;

said shaft, including said portion thereof, having a given temperature coefficient of expansion; and said core having a temperature coefficient of expansion less than said given temperature coefficient of expansion, whereby said air gap varies in inverse relationship to variations in temperature.

2. The invention as defined in claim 1 wherein said portion of said shaft is provided with magnetostrictive properties by means of a magnetic sleeve affixed thereto, said sleeve and said shaft being constructed of materials having the same given temperature coefficient of expansion.

3. The invention as defined in claim 1 wherein said core is provided with a plurality of primary and secondary poles, said plurality of poles being spaced around the periphery of said shaft, said primary and secondary windings being wound on primary and secondary poles, respectively, said air gap being the space between the ends of said poles and the surface of said portion of said shaft.

4. An electromagnetic torquemeter for a rotating shaft having magnetostrictive properties comprising:
   a transformer having a primary winding and at least one secondary winding;
   an annular magnetic core for said windings, said core surrounding said shaft and being longitudinally spaced along said shaft, each of said cores having a plurality of radial poles spaced from said shaft to provide a predetermined air gap at a given temperature;
   said windings being wound on said poles, the poles of said primary winding being angularly positioned at 45 degrees with respect to the poles of said secondary winding;
   said shaft being constructed of a material having one temperature coefficient of expansion; and
   said core being constructed of a material having a lower temperature coefficient of expansion.

5. The invention as defined in claim 4 wherein the magnetostrictive properties of said rotating shaft are provided by means of a sleeve constructed of magnetostrictive material affixed to said shaft, said sleeve and said shaft having the same temperature coefficient of expansion.

6. An electromagnetic torquemeter for measuring the torque applied to a shaft constructed of materials having electromagnetic properties, said shaft having a given temperature coefficient of expansion, said torquemeter having primary and secondary windings wound on a magnetic core surrounding said shaft with a predetermined air gap between said core and the surface of said shaft at a given temperature; said core being constructed of a material having a selected temperature coefficient of expansion different from said given temperature coefficient of expansion, whereby said air gap will vary in inverse relation to variations in temperature.

References Cited
UNITED STATES PATENTS

| 2,553,833 | 5/1951 | Rifenbergh | 73—136 |
| 3,011,340 | 12/1961 | Dahle | 73—136 |
| 3,340,729 | 9/1967 | Scoppe | 73—136 |

CHARLES A. RUEHL, Primary Examiner